US007993714B2

(12) United States Patent
Gorman

(10) Patent No.: US 7,993,714 B2
(45) Date of Patent: Aug. 9, 2011

(54) SYMBOL-BEARING FLUID RECEPTACLE

(76) Inventor: Gregory Winfield Gorman, Golden, CO (US)

( * ) Notice: Subject to any disclaimer, the term of this patent is extended or adjusted under 35 U.S.C. 154(b) by 263 days.

(21) Appl. No.: 10/696,373

(22) Filed: Oct. 29, 2003

(65) Prior Publication Data

US 2005/0095377 A1 May 5, 2005

(51) Int. Cl.
*B29D 22/00* (2006.01)
*B29D 23/00* (2006.01)
*B32B 1/08* (2006.01)

(52) U.S. Cl. ....................................... 428/35.7; 220/696

(58) Field of Classification Search ................. 428/35.7; 220/696; 116/207, 216; 374/157, 162
See application file for complete search history.

(56) References Cited

U.S. PATENT DOCUMENTS 4,032,687 A * 6/1977 Hornsby, Jr. ................. 428/1.61
5,323,652 A * 6/1994 Parker ............................. 73/295
7,048,971 B2 * 5/2006 Arora ............................ 427/402

* cited by examiner

*Primary Examiner* — Michael C Miggins

(57) ABSTRACT

A symbol-bearing receptacle for a fluid, said receptacle comprising a container for said fluid and a symbol disposed on said container, said symbol having a water reactivity characteristic that differs from the water reactivity of said container.

16 Claims, 5 Drawing Sheets

SYMBOL-BEARING FLUID RECEPTACLE

BACKGROUND

1. Field

This application relates generally to the field of fluid receptacles bearing symbols. More particularly, this application relates to fluid receptacles with symbols that become visible after being filled with fluid and thus convey information to the user and observers of the receptacle.

2. Discussion of Related Art

Receptacles for fluids are ubiquitous in modern life. They are used to hold fluids of all types. At the industrial level, fluid receptacles are used to transport and store hydrocarbons, aqueous solutions, plain water, liquid oxygen and many other fluids. At the consumer level, receptacles store most of the beverages and foodstuffs consumed by modern society, as well as automotive products, personal-care products, cleaning supplies and a wealth of other products.

Receptacles for fluids come in many forms. They are made of many different kinds of materials, including metal, plastic, ceramic and glass. They have thick walls when they are used to store fluids under pressure or are subject to shock or disturbances when they are being transported. They are made of insulating materials when they are used to refrigerate cold fluids or keep already cold fluids refrigerated. An insulated beer mug is one of many examples.

Receptacles for fluids come in all shapes and sizes. Industrial receptacles are sometimes very large, petroleum storage tanks and railroad tank cars being two examples. The size of consumer-scale receptacles is typically limited by the weight and volume that a typical consumer can transport and use. Common cross-sectional shapes of fluid receptacles are round, square and rectangular, but many other shapes are used also.

Some receptacles cannot be closed once opened. A metal can of a foodstuff is one example. The contents of such a can are not accessible until the top of the can is irreversibly removed with a metal cutting tool. Other receptacles can be opened and resealed. An example is a resealable plastic bag. Still other receptacles are rarely if ever closed, an example being, again, a beer mug.

Receptacles for fluids come in virtually every color known to the designer. Receptacles may be a single color or be multicolored. While many receptacles are opaque, many others—glass and plastic receptacles in particular—are transparent or translucent. Coloring is achieved by painting, anodizing or tinting, among other methods. Coloring also may be accomplished by labeling.

Labels are widely used with fluid receptacles. Some labels identify the contents of the receptacle. Other labels identify the maker of the fluid in the receptacle. Others provide the custodian or user with warnings about the contents of the receptacle or about the manner in which it should be used, one example being the warnings seen on medication bottles cautioning against access to and use by children. Still other labels are decorative in nature. Some labels have all of the foregoing characteristics.

Labels take many forms. Some are printed on plastic or paper and glued or affixed in some other manner to one or more surfaces of a receptacle. Others are painted onto the surface of the receptacle, or the receptacle surface is tinted with a penetrating stain or comparable material. Still other labels are embossed or embedded into the surface of the receptacle, with the resulting depressions sometimes being painted or tinted a color that contrasts with the surface of the receptacle.

The importance of receptacle labels to modern society cannot be overestimated. An unlabeled receptacle typically is useful only to the person that filled it, or to a person that has learned from some external source of the contents of the receptacle and been able to keep that knowledge secure. An unlabeled receptacle at a supermarket would be useless and potentially dangerous. For this and other reasons, labeling is almost universally required by law and the details of that labeling strictly defined and controlled.

For these reasons, labeling on fluid receptacles is typically fixed. That is, it does not change when fluid is being added or removed from the receptacle. There is a need, however, for receptacle labeling that changes upon addition or removal of fluid. In security applications, for example, it is useful to have labeling that is not visible until visibility is desired. Thus, the contents of secret industrial chemicals could be kept confidential during storage. In the consumer context, labels that appear upon use of the receptacle have advertising uses, among others.

SUMMARY

The claims at the close of this specification set forth a full and accurate description of applicant's successful solution to the problems discussed above. To the extent consistent with those claims, applicant states that he has developed at least the following:

A symbol-bearing receptacle for a fluid, said receptacle comprising a container for said fluid and a symbol disposed on said container, said symbol having a water reactivity that differs from the water reactivity of said container.

In addition: a symbol-bearing receptacle for a fluid, said receptacle comprising a container for said fluid, a symbol affixed to said container, and means for creating a contrast in appearance between said container and said symbol when the temperature of said container is reduced to the condensation point.

In addition: a method for creating a contrast in appearance between a fluid receptacle and a symbol, said method comprising the steps of selecting a receptacle having a first water reactivity, affixing to said receptacle a symbol having a second water reactivity that differs from said first water reactivity, reducing the temperature of said receptacle to the condensation point, and observing said symbol on said receptacle.

Further in addition: A system for generating a symbol on a substrate, said system comprising a base disposed on said substrate, a wall affixed to and extending upwardly from said base to form with said base an open fluid receptacle, and a symbol disposed on said base, said symbol facing said substrate and comprising a material that is dissimilar to the material surrounding said symbol, wherein a pattern of said symbol develops on a surface rested upon by said base due to water condensation.

Figure 3:
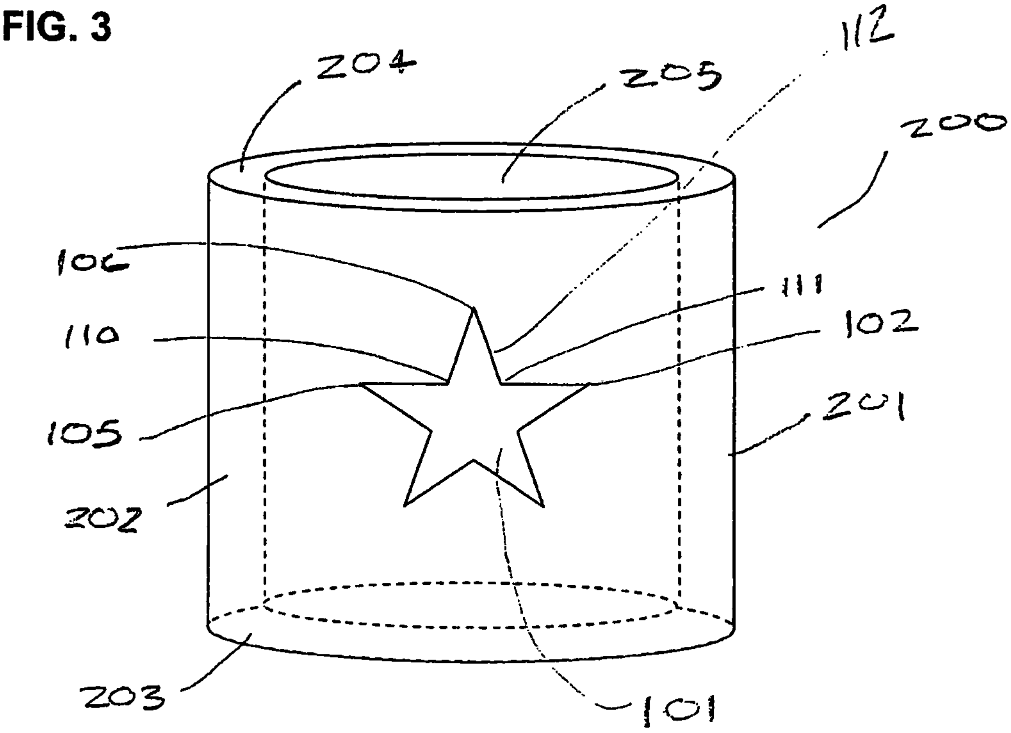
FIG. 3 depicts a perspective view of a fluid receptacle bearing the symbol depicted in FIG. 1.

FIG. **4*a* depicts a perspective view of the fluid receptacle of FIG. 3** filled with fluid.

Figure 5:
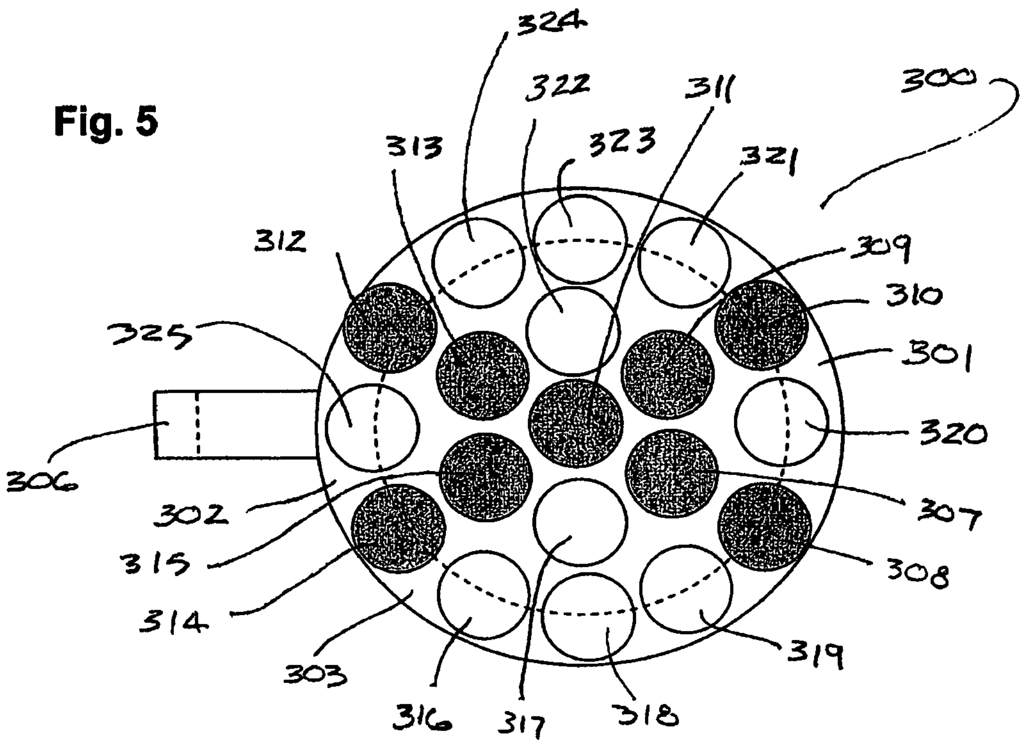

FIG. 5 depicts a bottom view of a beverage mug bearing a symbol.

Figure 6:
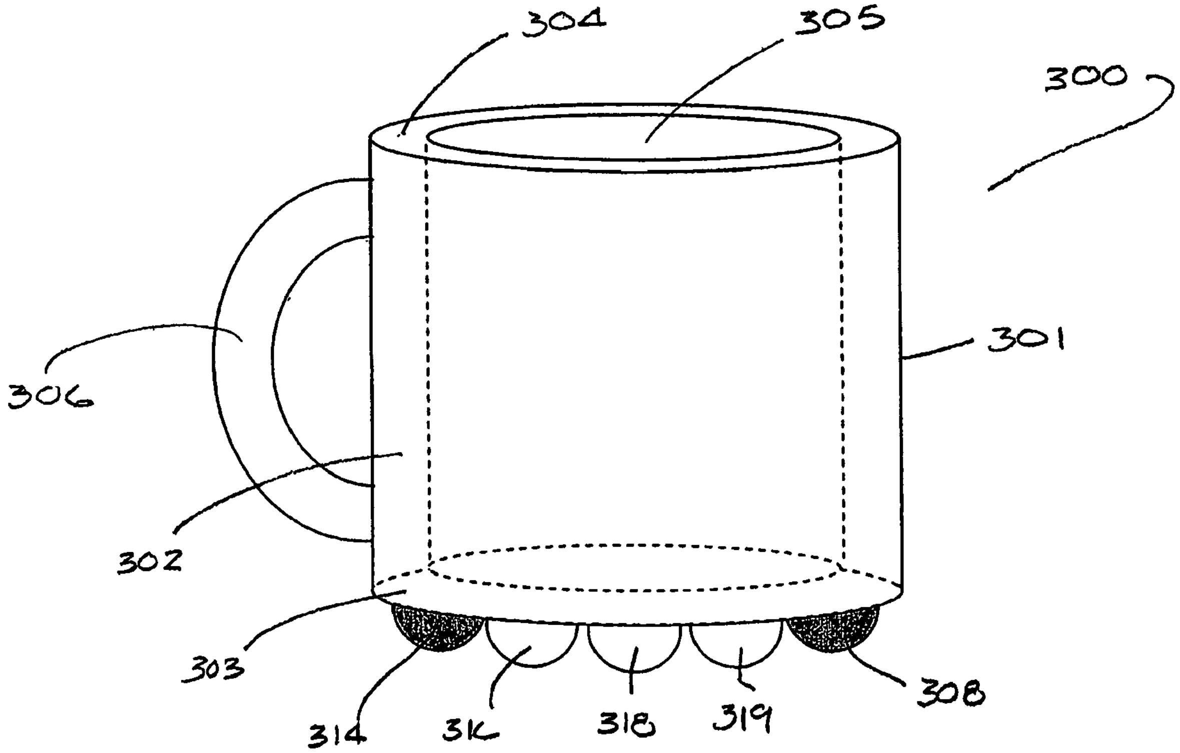

FIG. 6 depicts a perspective view of the mug of FIG. 5.

Figure 7:
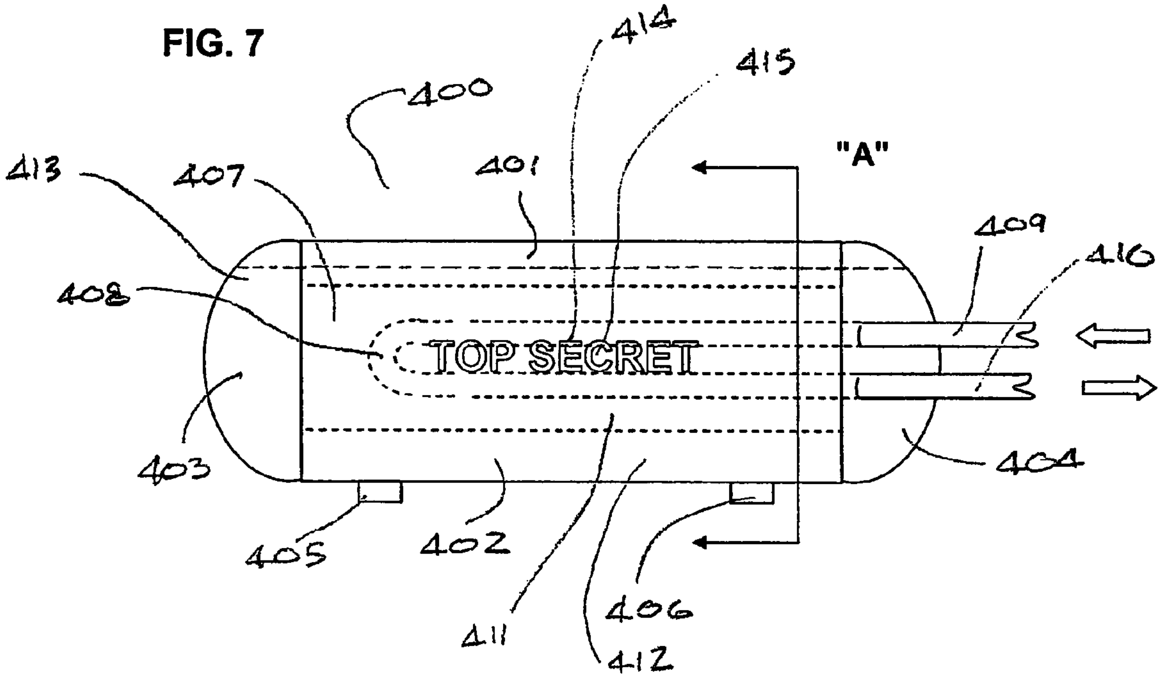

FIG. 7 depicts a front view of an industrial tank bearing symbols.

Figure 8:
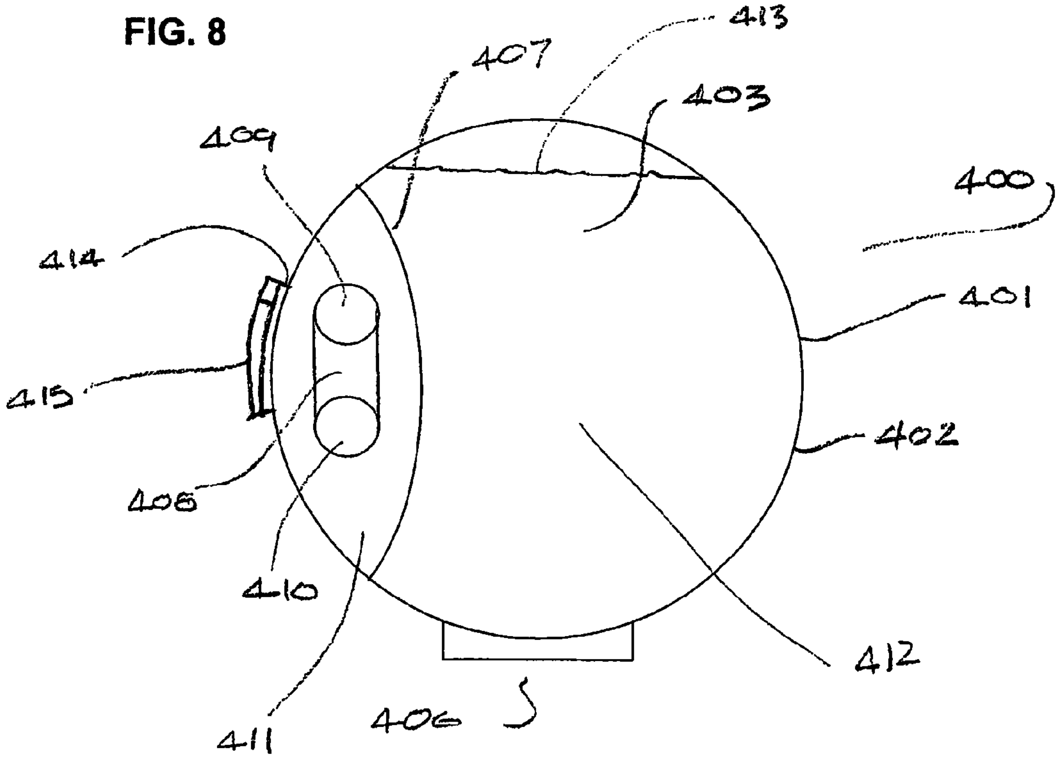

FIG. 8 depicts an end view of the industrial tank of FIG. 7.

DETAILED DESCRIPTION OF THE DRAWINGS

Figure 1:
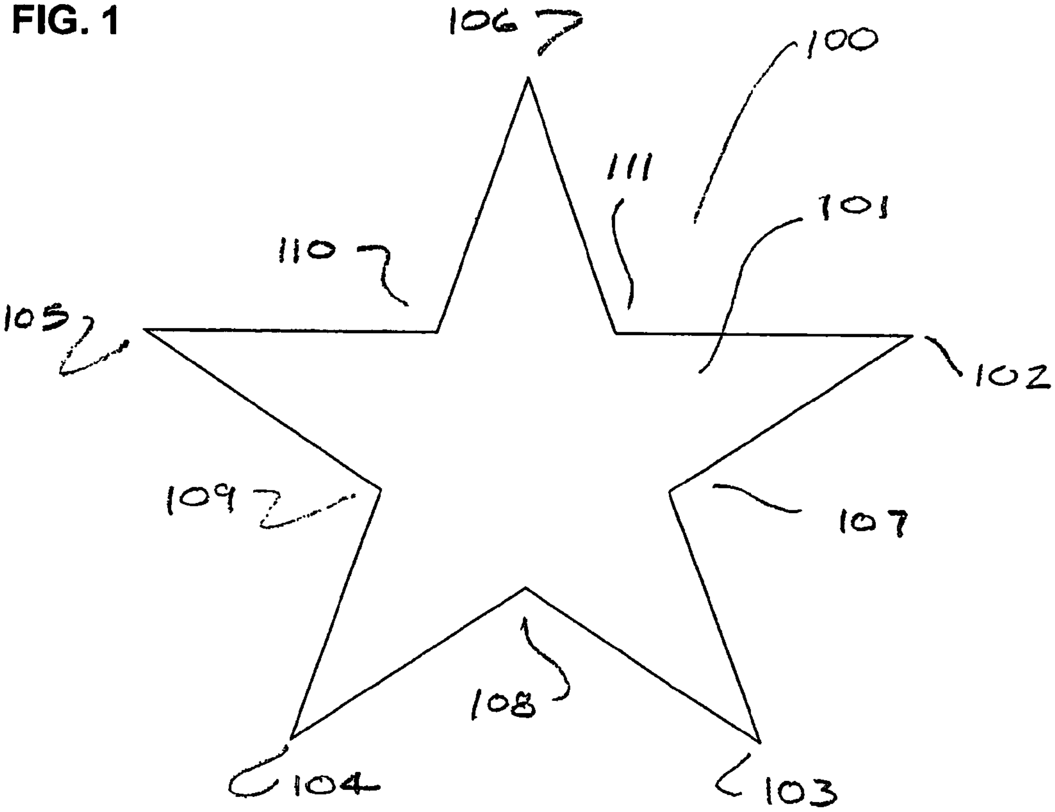
FIG. 1 depicts a top view of a symbol.

FIG. 1 depicts a top view of a symbol 100. The symbol is, by way of illustration, in the shape of a five-pointed star. The symbol comprises a symbol body 101 that bears points 102, 103, 104, 105 and 106. Between these points are corresponding angles 107, 108, 109, 110 and 111. Symbol body 101 is cut from a hydrophilic plastic film. The film is smooth and transparent in this illustrated example.

Figure 2:
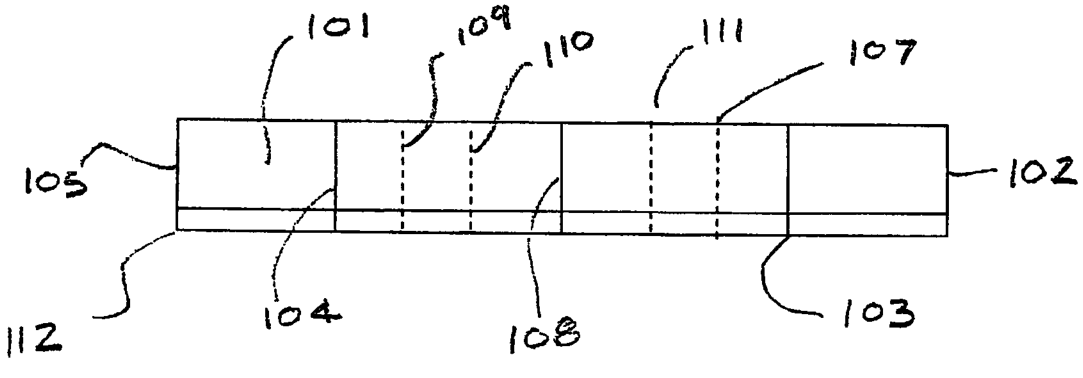
FIG. 2 depicts a bottom view of the symbol of FIG. 1.

FIG. 2 depicts a bottom view of the symbol body 101 of FIG. 1. Points 102, 103, 104 and 105 are directly visible, as is angle 108. The back of symbol body 101 bears an adhesive layer 112. The purpose of adhesive layer 112 is to affix symbol body 101 to a fluid receptacle. Adhesive layer 112 comprises a pressure sensitive adhesive. It was formed by coating a liquid adhesive composition on the back of symbol body 101 and allowing it to dry, forming an adhesive layer capable of adhering symbol body 101 to a receiving surface of a fluid receptacle. Adhesive layer 112 is, for example, transparent.

FIG. 3 depicts a perspective view of a fluid receptacle assembly 200, which comprises a receptacle body 201 and a symbol body 101. Receptacle body 201 comprises a cylindrical wall 202 and a receptacle base 203. Receptacle wall 202 terminates at its upper end in receptacle edge 204, which defines the top of the internal receptacle space 205. Receptacle body 201 is fabricated from smooth, transparent, hydrophobic glass.

Figure 4:
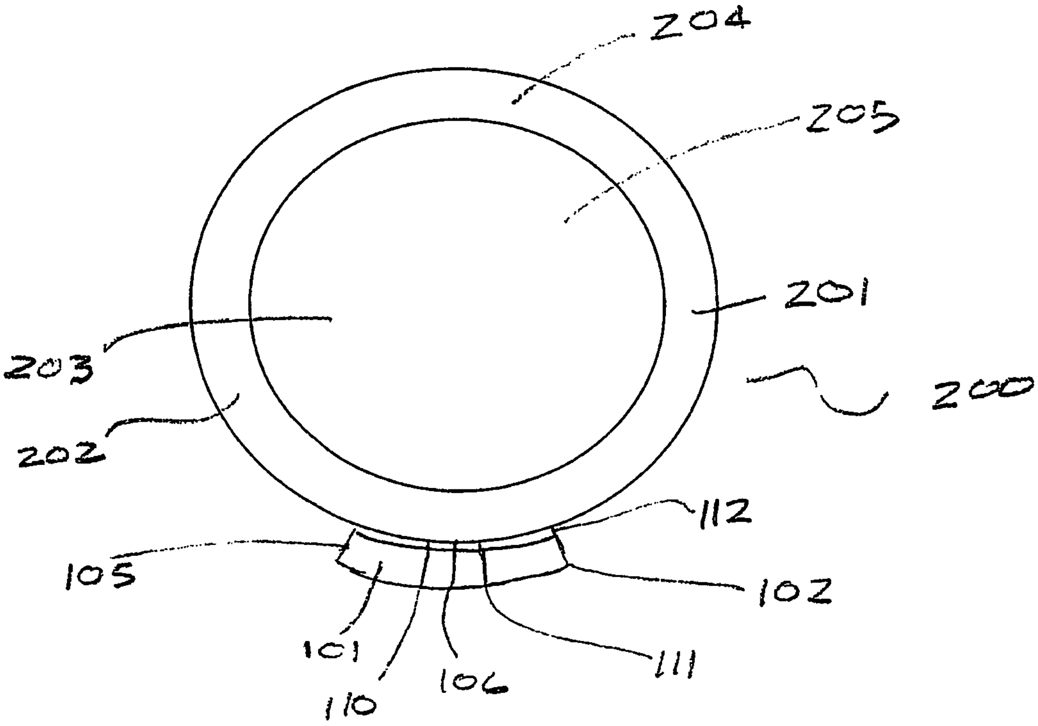
FIG. 4 depicts a top view of the fluid receptacle and symbol of FIG. 3.

As further illustrated in FIG. 4, which depicts a top view of the fluid receptacle of FIG. 3, symbol body 101 is affixed to receptacle body 201 by pressure sensitive adhesive layer 112. As shown, symbol body 101 is affixed to the surface of receptacle body 201, but it also could be affixed or embedded into a depression in receptacle body 201 to make it more resistant to dislodging by external forces. Because receptacle body 201 is smooth and transparent, because symbol 101 body is smooth and transparent, and because adhesive layer 101 also is transparent and joins these smooth, transparent surfaces, symbol body 101 is barely if at all visible on receptacle body 201.

Figure 4A:
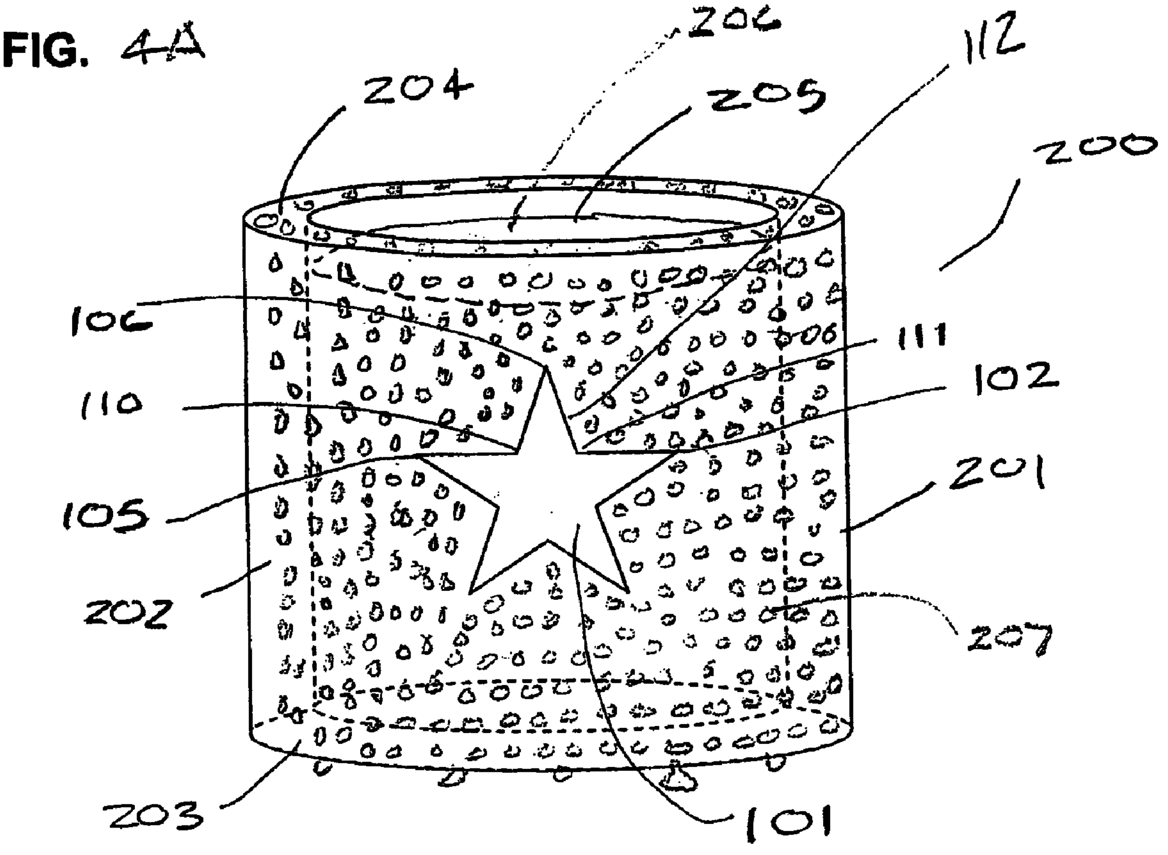

FIG. 4*a* depicts fluid receptacle assembly 200 after additional of a cold fluid 206 to internal receptacle space 205 of receptacle body 201. The fluid 206 is sufficiently cold to reduce the temperature of receptacle assembly 200 to the condensation point in the environment where receptacle assembly 200 is situated. This causes the formation of condensation beads 207 on the outer surfaces of receptacle body 201 because of the smooth, hydrophobic surfaces of receptacle body 201.

Symbol body 101, on the other hand, is hydrophilic. For this reason, water beads do not form on symbol body 101. Instead, symbol 101 body is coated with a relatively uniform film of water. This causes symbol body 101 to differ in appearance from the surrounding surfaces of receptacle body 201, and renders symbol body 101 visually distinct from receptacle body 201.

Symbol body 101 may be any known symbol or group of symbols. A symbol may be a non-language symbol, as shown in FIG. 1. A snowflake, an exclamation point and a business logo are other examples, among many others. A symbol also may be a language symbol, such as one or more letters of an alphabet. English language symbols would be probable symbols of choice in an English-speaking country. On the other hand, Arabic language symbols would be appropriate for an Arabic-speaking country.

Symbols may be configured to serve a wide range of purposes, among them the purposes served by fluid receptacle labels. Some labels identify the contents of the receptacle. Other labels identify the maker of the fluid in the receptacle. Others provide the custodian or user with a warning about the contents of the receptacle or about the manner in which it should be used, one example being the warnings seen on medication bottles cautioning against access to and use by children. Still other labels are decorative in nature. Some labels have all of the foregoing characteristics.

Symbols may be fabricated from a wide variety of materials, provided that the color and surface finish be chosen to match the color and surface finish of the fluid receptacle to which the symbols will be affixed, although color matching is not required where the symbol is transparent or translucent. In addition, the material of which a symbol is fabricated should have a water reactivity that differs from the water reactivity of the fluid receptacle to which the symbol will be affixed. Thus, if a fluid receptacle is fabricated from a hydrophilic material, the symbol should be fabricated from a hydrophobic material. Conversely, if the fluid receptacle is fabricated of a hydrophilic material, the symbol should be fabricated from a hydrophobic material, as discussed in connection with FIGS. 1 though 4A above. A symbol also may be made of a thermosensitive material that changes color with a change in temperature.

The material used to fabricate a symbol may take the form of a film of plastic, silicone, metal or other suitable material. The choice of material is dictated by the problem at hand and is a matter of design choice. The same is true of the film thickness. In general, symbols fabricated from thicker films tend to be more visible before the fluid receptacle is cooled. The symbol may be fabricated from film stock or it may be formed in situ. For example, the symbol may be painted on a fluid receptacle with a paint having the desired characteristics.

The adhesive layer may be any suitable material. The adhesive layer need not be formed on the symbol. It may, instead, be formed on the fluid receptacle. The thickness of the adhesive layer should be minimized in most applications. The choice, placement and thickness of the adhesive layer is dictated by the problem at hand and is a matter of design choice.

FIG. 7 depicts a front view of a fluid receptacle assembly 400 comprising an industrial tank 401 and written symbols 415. Industrial tank 401 comprises cylindrical section 402 and tank ends 403 and 404. Industrial tank 401 rests on tank feet 405 and 406. The entirety of industrial tank 401 is painted with a flat gray hydrophobic paint.

The interior of industrial tank 101 is divided into chambers 411 and 412 by internal baffle 407. U-tube 408 resides within chamber 411. Tube ends 409 and 410 of U-tube 408 penetrate end cap 404. Together, U-tube 408 and its tube ends 409 and 410 define a confined passageway for coolant through chamber 411.

Symbols 415 are in the English language. They spell out the words "TOP SECRET," thus indicating that the contents 413 of industrial tank 401 are classified. In the application of FIG. 7, it is desired that this status of the contents 413 of industrial tank 401 will not normally be visible.

Symbols 415 are fabricated from transparent plastic film. The surface finish of the symbols is sufficiently flat to match the flat finish of the paint of industrial tank 101. Because that paint is hydrophobic, the material of symbols 415 is chosen to be hydrophilic. As noted, the type, thickness and characteristics of the material chosen for symbols is a matter of design choice depending on the application.

FIG. 8 depicts a sectional end view of the fluid receptacle 400 of FIG. 7. As shown, symbols 415 are affixed to industrial tank 401 with a transparent adhesive layer 414. As noted, the choice and configuration of adhesive is a matter of design choice depending on the application.

The symbols depicted in FIGS. 1, 2, 3, 4, 7 and 8 are relatively thick. They also may be microscopically thin and virtually invisible from the side. In addition, they may be embedded or doped into the receptacle body to provide the desired properties. Again, the choice of these parameters is a matter of design choice dictated by the application.

Symbols 415 are made visible by passing a coolant through U-tube 408. Because U-tube 408 is confined within chamber 411, relatively little coolant is required quickly to cool the liquid 413 adjacent to the exterior wall of chamber 411. This cools the exterior wall to the condensation point in the environment where industrial tank 101 is situated, and in turn causes the formation of water beads on the outer surface of industrial tank 101 that surrounds symbols 415 as a consequence of the hydrophobic nature of that surface. Symbols 415 become visible because water beads do not form on them as a consequence of their hydrophilic nature.

FIGS. 5 and 6 depict a beverage mug assembly 300. FIG. 5 depicts a bottom view of the beverage mug assembly 300 and FIG. 6 depicts a perspective view of the beverage mug assembly 300. The assembly comprises a mug body 301 and an array of semi-spherical mug extensions 307 through 325. The mug body comprises a cylindrical wall 302, which terminates at its top end in lip 304 and at its bottom end in base 303, defining internal volume 305. Mug handle 306 is attached to cylindrical wall 302.

Mug extensions 307 through 325 space base 303 from the substrate on which beverage mug assembly 300 rests, thus insuring that moisture-bearing ambient air circulates underneath base 303 of beverage mug assembly 300. Mug extensions 307 through 315 are hydrophobic. They extend from the center of base 303 to form the symbol “X.” Mug extensions 316 through 325 are hydrophilic and surround the symbol “X”.

When beverage mug assembly 300 is filled with a beverage that is sufficiently cold to cause the exterior of beverage mug assembly 300 to reach the condensation point in the environment where beverage mug assembly 300 is situated, beads of condensation form on mug extensions 316 through 325 because they are hydrophilic. Beads of condensation do not form on mug extensions 307 through 315 because they are hydrophobic. When condensation on mug extensions 316 through 325 is sufficient to cause deposition of condensate on the substrate that supports beverage mug assembly 300, a counterpart of the symbol “X” formed by mug extensions 307 through 315 is created on the substrate in the form of a dry symbol “X” surrounded by droplets or a film of water.

Mug extensions 307 through 325 may be molded as parts of mug body 301 and then treated as necessary to generate the hydrophilic and hydrophobic properties necessary to form the desired symbol. Alternatively, some or all of mug extensions 307 through 325 may be made separately from mug body 301 and affixed to mug body 301 with a suitable adhesive. Mug extensions 307 through 325 may be made of any suitable material, including glass, plastic and rubber. The choice of these materials and the number, sizing and placement of mug extensions 307 through 325 is a matter of design choice depending on the application.

The following is claimed:

1. A symbol-bearing receptacle for a fluid, said receptacle comprising:

a container for said fluid; and a transparent symbol disposed on said container, said symbol having a water reactivity that differs from a water reactivity of said container;

wherein the difference in water reactivities renders said symbol visually distinct from said container when said container holds said fluid and when a temperature of said container is reduced to a condensation point in an environment where the receptacle is situated, due to the formation of condensation on at least a portion of said receptacle.

2. The symbol-bearing receptacle of claim 1, wherein said symbol is hydrophilic and said container is hydrophobic.

3. The symbol-bearing receptacle of claim 1, wherein said symbol is hydrophobic and said container is hydrophilic.

4. The symbol-bearing receptacle of claim 1, wherein said symbol comprises a plastic film.

5. The symbol-bearing receptacle of claim 1, wherein said symbol comprises a silicone film.

6. The symbol-bearing receptacle of claim 1, wherein said symbol is embedded in a surface of said container.

7. The symbol-bearing receptacle of claim 1, said container comprising a confined passageway disposed within a surface of the container.

8. The symbol-bearing receptacle of claim 7, said passageway configured for holding a coolant.

9. A symbol-bearing receptacle for a fluid, said receptacle comprising:

a container for said fluid, the container comprising an open fluid receptacle formed of a base disposed upon a substrate and a wall affixed to and extending upwardly from said base; and a transparent symbol disposed on said base and facing said substrate, said symbol having a water reactivity that differs from a water reactivity of said container;

wherein the difference in water reactivities renders said symbol visually distinct from said container when said container holds said fluid and when a temperature of said container is reduced to a condensation point in an environment where the receptacle is situated, due to the formation of condensation on at least a portion of said receptacle.

10. The symbol-bearing receptacle of claim 9, said symbol comprising a pattern that develops on a surface supporting said base due to water condensation, when said container holds said fluid and said temperature is reduced to said condensation point.

11. The symbol-bearing receptacle of claim 9, further comprising a plurality of base extensions elevating said substrate from said base, wherein one or more of said base extensions form said symbol.

12. The symbol-bearing receptacle of claim 9, said base comprising a material surrounding said symbol that is dissimilar to material forming said symbol.

13. The symbol-bearing receptacle of claim 12, wherein said material forming said symbol is hydrophilic and said material surrounding said symbol is hydrophobic.

14. The symbol-bearing receptacle of claim 12, wherein said material forming said symbol is hydrophobic and said material surrounding said symbol is hydrophilic.

15. The symbol-bearing receptacle of claim 9, said container further comprising a confined passageway disposed within one or both of said base and said wall.

16. The symbol-bearing receptacle of claim 15, said confined passageway configured for holding a coolant.

* * * * *